United States Patent Office 3,004,559
Patented Oct. 17, 1961

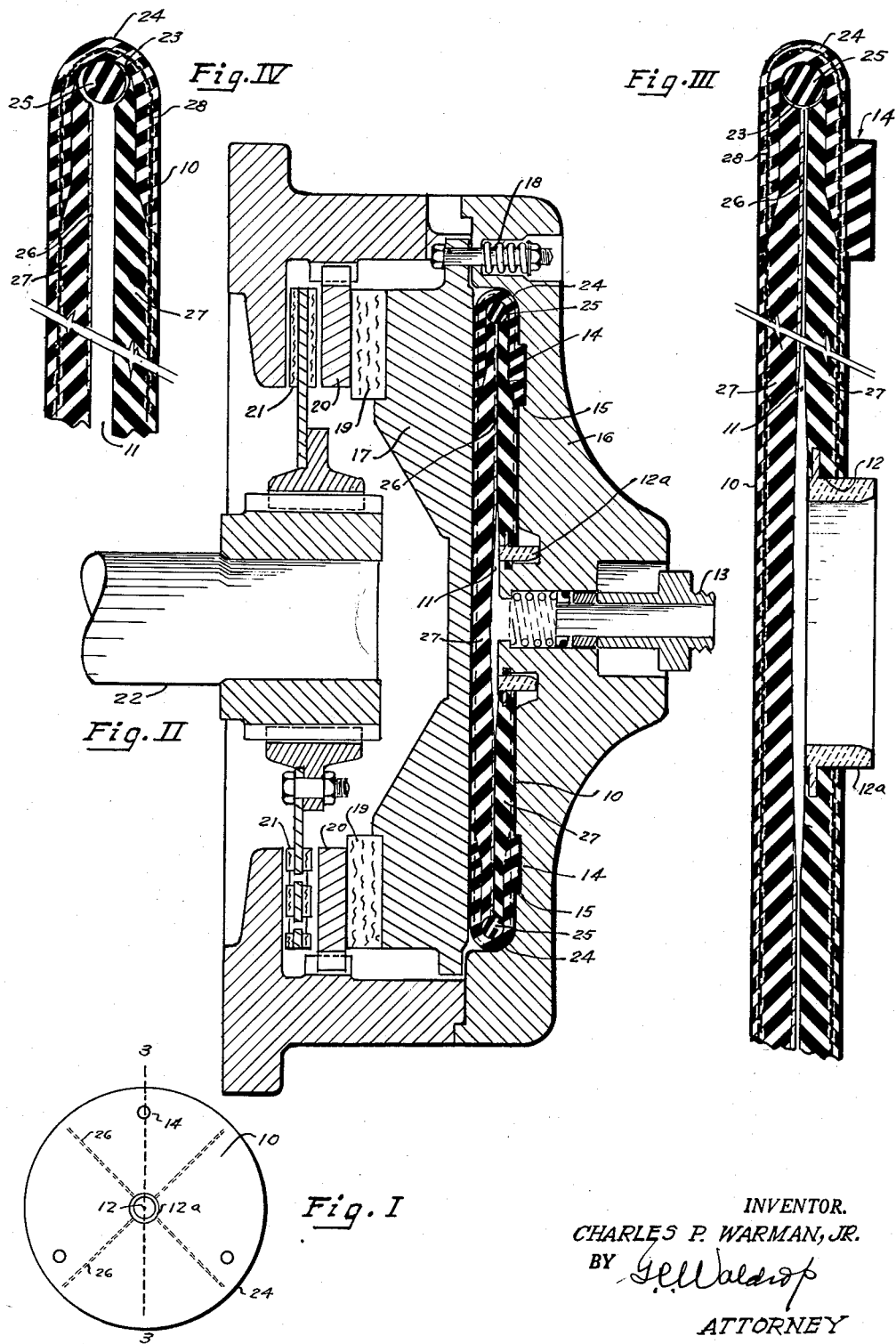

3,004,559
PANCAKE AIR TUBE AND METHOD
OF MAKING SAME
Charles P. Warman, Jr., Box 1150, Wichita Falls, Tex.
Filed Mar. 17, 1958, Ser. No. 721,940
4 Claims. (Cl. 137—784)

This invention relates to tubes by which clutches and brakes are operated, and more particularly to tubes having the maximum of effective surface, which are operative within any given diameter. One of my novel features is a solid disk or pancake type tube. Another novel feature is the provision of such a tube having a near zero of open cavity within the normal chamber when in the closed or deflated position and requiring a minimum of activating fluid when in a stroking position. Air, gas, water, or other fluid may be employed; however typical novel features will be pointed out with my tube operated by air from a conventional supply.

One economy greatly in favor of my tube is that total clutch or brake structure for a given load transmission may be much smaller and lighter than conventional structures of this type. Other advantages will be readily apparent to those skilled in the art from the following description together with the accompanying drawings in which:

FIGURE I is an elevation of one side of my pancake tube;

FIGURE II is a schematic view of my tube installed in a clutch;

FIGURE III is a part section enlarged along line 3—3 of FIGURE I in near closed position;

FIGURE IV is a section of my tube in expanded position.

In the several figures, like references indicate similar parts wherein 10 is a pancake shaped tube having an inner cavity 11 closed except for the spud opening 12 by which the inflating medium is introduced into cavity 11 from any convenient conventional source, not shown, through pipe 13. Lugs or extensions 14 may be provided on the outer face of the tube to be received by cavities 15 in the surface plate 16 of the clutch structure by which the tube may be secured to operate rotatively with that section of the clutch which is attached operatively with a source of rotary power not shown. The opposite plate 17 of the clutch mechanism is provided with spring mechanism 18 by which the clutch plates are held together resistively of the inflationary action of the pressure medium introduced into the tube. 19 is a pressure plate of the clutch structure by which friction plate 20 is caused to engage frictionally with part 21 through which rotative effort is imparted to shaft 22 to a machine to be operated. It will be understood that the clutch plate 16 and attached mechanism is retained non-rotatively of the driven shaft 22. A circular opening 23 is formed circularly about the outer diameter of cavity 11 thus providing a flex section 24 of ample proportion of the tube 10 to provide for the predetermined maximum expansion of the tube. O ring 25 may be utilized in a preferred form of my tube for partially filling circular opening 23 whereby the air volume necessary to actuate the tube is held to a minimum, and to facilitate the manufacture of the tube.

Radially disposed grooves or channels 26 may be provided along the mating inner flat surfaces of my tube whereby to more readily permit the introduction of compressed air into and discharge from the cavity 11 of the tube.

In the manufacture of my tube I may first mold disks 27—27 of rubber for the flat or non-flexing sections into one of which spud 12a has been bonded. About disks 27 an outer section of flex section 24 provided with a reinforcing fabric or cord 28 is embedded. The O ring 25 may have been introduced into position before the flex section is applied. The whole is then cured in the conventional manner for rubber tubes.

The operation is as follows: The clutch parts are assembled about tube 10. Plates 16 and 17 are operatively secured together by spring mechanism 18. Air under pressure is introduced through pipe 13 into cavity 11 whereby the tube is expanded and bearing plate 19 is brought against friction plate 20. The air pressure in the tube will overcome the resistance of spring mechanisms 18; and when the air pressure is released by valve mechanism connected with pipe 13, the springs will then return the tube to normal unexpanded position and free the pressure plate 19 from engagement with friction plate 20.

Thus it will be seen that the entire surface of a complete disk face of my tube is utilized in actuating a clutch mechanism. Should shaft 22 be rotating and it was desired to interrupt this movement while plate 16 was in a non-rotative status, the introduction of air into cavity 11 would cause the parts to engage part 21 and thereby act as a brake.

No part of the clutch or brake mechanism per se is a part of my invention, it being requisite only that such mechanism be provided which will close about the flat outer faces of my clutch tube in such a manner as to bring the flat inner faces approximately together when in inoperative position whereby the full thrust effort of my tube may be obtained by the use of a minimum of pressure medium.

What I claim is:

1. A fluid-actuated inflatable tube comprising two substantially-continuous flat discs disposed in parallel adjacent relation and joined around their peripheries by an annular resilient flexing-section of semicircular cross-section, the tube being thicker in the discs than in the flexing section and having a substantially toroidal internal cavity adjacent the flexing section and of cross-sectional diameter which is great as compared with the spacing between discs when the tube is deflated; an O-ring filling said cavity when the tube is deflated to substantially fill the volume thereof; and spud means passing through and bonded to at least one of said discs.

2. In a tube as set forth in claim 1, said discs having mutually opposed internal faces, and at least one of said faces having a plurality of channels recessed thereinto and extending away from each other in a plurality of directions, each channel communicating with the area of the face nearest said spud means.

3. A resilient fluid actuator comprising a pancake-shaped tube having two parallel disc portions joined together by a circular resilient flexing section of reduced thickness, thereby leaving within the tube a substantially toroidal cavity adjacent said flexing section; an annular ring substantially filling said cavity when the tube is deflated so that said disc portions come into mutual contact; and spud means passing through and fixed in at least one of said disc portions.

4. In a tube as set forth in claim 3, said discs having mutually opposed internal faces, and at least one of said faces having a plurality of channels recessed thereinto and extending away from each other in a plurality of directions, each channel communicating with the area of the face nearest said spud means.

References Cited in the file of this patent

UNITED STATES PATENTS

| | | | |
|---|---|---|---|
| 2,007,677 | Farmer | July 9, | 1935 |
| 2,023,135 | Hawkins | Dec. 3, | 1935 |
| 2,076,071 | De Bolt | Apr. 6, | 1937 |
| 2,251,444 | Fawick | Aug. 5, | 1941 |
| 2,431,937 | Hunter | Dec. 2, | 1947 |
| 2,563,673 | Cardwell et al. | Aug. 7, | 1951 |
| 2,612,909 | Keller | Oct. 7, | 1952 |
| 2,666,007 | Hovey | Jan. 12, | 1954 |
| 2,688,983 | Bowerman | Sept. 14, | 1954 |
| 2,762,737 | Keller | Sept. 11, | 1956 |
| 2,839,440 | Pfeiffer et al. | June 17, | 1958 |